United States Patent [19]

Kaiser et al.

[11] 4,014,708
[45] Mar. 29, 1977

[54] LIQUID STOVING-LACQUER SYSTEMS BASED ON OIL-FREE POLYESTERS

[75] Inventors: Bernd-Ulrich Kaiser; Rolf Dhein; Rolf Küchenmeister; Hans-Michael Fischler, all of Krefeld, Germany

[73] Assignee: Bayer Aktiengesellschaft, Germany

[22] Filed: Nov. 4, 1975

[21] Appl. No.: 628,777

Related U.S. Application Data

[63] Continuation-in-part of Ser. No. 528,088, Nov. 29, 1974, abandoned.

[30] Foreign Application Priority Data

Dec. 6, 1973  Germany .......................... 2360710

[52] U.S. Cl. ......................... 106/287 R; 260/31.6; 260/410.6; 260/485 G
[51] Int. Cl.[2] ..................... C07C 69/34; C08K 5/10

[58] Field of Search ............... 106/287 R; 260/31.6, 260/485 G

[56] References Cited

UNITED STATES PATENTS

| | | | |
|---|---|---|---|
| 2,499,984 | 3/1950 | Beavers ............................ | 260/31.6 |
| 3,148,147 | 9/1964 | Bell et al. ....................... | 260/410.6 |

*Primary Examiner*—Theodore Morris
*Attorney, Agent, or Firm*—Connolly and Hutz

[57] ABSTRACT

Liquid stoving-lacquer systems based on oil-free polyesters obtained by reacting polybasic carboxylic acids or their anhydrides and 2-ethylpropane diol-1.3 and optionally additional polyhydric alcohols, are highly compatible with melamine resins.

5 Claims, No Drawings

LIQUID STOVING-LACQUER SYSTEMS BASED ON OIL-FREE POLYESTERS

This application is a continuation-in-part application of our application Ser. No. 528,088, filed Nov. 29, 1974, now abandoned.

For some years now, stoving-lacquer systems based on oil-free polyesters combined with aminoplasts, such as melamine resins, have been used for surface coating. The increasing significance of these systems can be attributed to their outstanding mechanical properties and to their extremely high resistance to yellowing. Lacquer systems containing polyesters of diols, dicarboxylic acids and, optionally, other polyhydric alcohols having 3 to 6 OH groups per molecule, are of particular value. One disadvantage of these oil-free polyesters is their occasionally poor solubility in aromatic solvents, such as xylene for example. In addition, their compatibility with aminoplasts, especially with the known butylated melamine resins, is often inadequate with the result that in some cases the lacquer mixture has to be heat-treated (for example German Offenlegungsschrift No. 1,805,182, page 13, paragraph 1).

This disadvantage does not arise in cases where diols such as, for example, 2,2-dimethylpropane diol-1.3, are used (Deutsche Farben-Zeitschrift 20 (1966), page 519, right-hand side, paragraph 4). The polyesters are soluble in xylene and show wide compatibility with aminoplasts such as, for example, melamine resins. However, they are inferior to the aforementioned polyesters (German Offenlegungsschrift No. 1,805,194, page 1) in other lacquer properties such as hardness and elasticity. In addition, polyesters of this kind give rise to difficulties during production (cf. also Deutsche Farbenzeitschrift 20 (1966), page 520, left-hand column, penultimate paragraph). The 2.2-dimethylpropane diol-1.3 volatilises in relatively large quantities during the condensation process. It goes without saying that any losses of a reaction component are a disadvantage.

Accordingly, the object of the present invention is to provide liquid stoving-lacquer systems based on oil-free polyesters which are readily soluble in aromatic solvents and highly compatible with aminoplast resins and which, in addition do not show any of the disadvantages referred to above in regard to such lacquer properties as hardness and elasticity.

According to the invention, this object has been achieved by the development of lacquer systems based on oil-free polyesters of dicarboxylic acids and/or their anhydrides, 2-ethylpropane diol-1.3 and, optionally, other polyhydric alcohols.

Accordingly, the invention provides liquid stoving-lacquer systems based on oil-free polyesters of polybasic carboxylic acids and/or their anhydrides and polyhydric alcohols which polyesters have an acid number of from 1 to 40 and a hydroxyl number of from 50 to 400, characterized in that the alcohol starting components of said polyester consist of A. 30 – 100 mol-%, based on the sum of components A and B, of 2-ethylpropane diol-1.3, B. 70 – 0 mol-%, based on the sum of components A and B, of alcohols having from 2 to 6, preferably from 3 to 4, hydroxyl groups and optionally C. 0 – 30, preferably 0 – 20, mol-%, based on component A, of other diols.

Coatings of the stoving lacquer systems according to the invention show outstanding properties, especially in regard to hardness and elasticity. In addition, the polyesters thereof are soluble in aromatic solvents such as xylene, are also highly compatible with aminoplast resins and can also be combined with isocyanates or masked isocyanates.

Polycondensation of the polybasic carboxylic acids and/or their anhydrides with the alcohol components is accompanied by only a minimal loss of 2-ethylpropane diol-1.3. In this respect, 2-ethylpropane diol-1.3 behaves completely differently from, for example, 2,2-dimethylpropane diol-1.3 which largely volatilises during production of the polyester.

Oil-free polyesters of polybasic carboxylic acid, 2-ethylpropane diol-1.3 and, optionally, other polyhydric alcohols can thus be obtained without any serious losses of dihydric alcohol during condensation. There is no need for elaborate apparatus, such as columns, or for azeotropic procedures involving the use of a water separator for producing polyesters of the kind in question.

Acid components suitable for the preparation of the polyesters are aliphatic, cycloaliphatic saturated and/or aromatic polybasic carboxylic acids, preferably di-, tri-and tetrabasic carboxylic acids containing 4 to 12 carbon atoms per molecule and the anhydrides thereof, e.g. phthalic acid anhydride, isophthalic acid, terephthalic acid, tetra-hydro- and hexahydrophthalic acid anhydride, trimellitic acid anhydride, pyromellitic acid anhydride, fumaric acid, maleic acid anhydride, adipic acid, glutaric acid and succinic acid as well as halogenated acids such as chlorophthalic acid and Het acid.

It is preferred to use phthalic acid and adipic acid and particularly preferred to use a mixture of phthalic acid and adipic acid. The ratio between the two dicarboxylic acids can be varied according to the required hardness and elasticity of the coatings: It preferably consists of 90 to 50 mol-% of phthalic acid and 10 to 50 mol-% of adipic acid.

Alcohols B and C suitable for the preparation of the polyesters are aliphatic, cycloaliphatic and/or aromatic alcohols containing 2 to 6, preferably 3 to 4, hydroxyl groups attached to non-aromatic carbon atoms, glycols such as ethylene glycol, propylene glycol-1.2, butane diols, dimethylolcyclohexane, 2.2-dimethylpropane diol-1.3; ether alcohols such as diethylene and triethylene glycols; oxethylated bisphenols, perhydrogenated bisphenols; trimethylolethane, trimethylolpropane, glycerol, pentaerythritol, dipentaerythritol, manitol and sorbitol, trimethylolpropane being preferred.

In cases where up to 30 mol-% of 2,2-dimethyl-1,3-propanediol are added, there is no deterioration in the favourable lacquer properties of the coatings. However, production of the polyesters may be accompanied by a loss of 2,2-dimethyl-1,3-propanediol.

The starting component molar ratio polybasic carboxylic acids resp. anhydrides/polyhydric alcohols is preferably from 0.6 : 1 to 12 : 1.

The polyesters can be polycondensed by conventional methods. They are preferably produced by melt condensation. To this end, the components are heated with stirring to 190°–270° C in a distillation apparatus over a period of 5 to 15 hours, during which nitrogen is passed through, and kept in this temperature range until a certain acid number and viscosity are reached. Suitable viscosities are those corresponding to a time of outflow of from 20 to 300 seconds (60% by weight in xylene, destined in accordance with DIN 53 211).

The molecular weight destined as number average of the polyesters is from 500 to 10.000 (molecular weights below 5000 destined by vapour pressure osmosis in dioxane and acetone; if both values differ from each other the lower value is considered to be the more accurate one; molecular weights above 5000 destined by membrane osmosis in acetone).

The lacquer systems according to the invention are also suitable for low-solvent lacquer systems containing less than 30% by weight and preferably less than 20% by weight of organic solvents. If desired they may even be processed free from organic solvents.

Suitable organic solvents are, for example, monohydric and dihydric alcohols such as ethanol, isopropanol, butane diols, ethyleneglycol monoalkyl ethers such as ethyleneglycol monomethyl, monoethyl and monobutyl ether, esters such as ethyl and butyl acetate, ketones such as acetone, ethyl methyl ketone, ketoalcohols, cyclic ethers such as tetrahydrofurane, and hydrocarbons.

Standard auxiliaries, stabilisers, pigments, fillers can also be used.

The polyester lacquers according to the invention can be mixed with aminoplast resins as cross-linking agents according to the ratio 60 – 95% by weight polyester 40 – 5% by weight aminoplast.

Suitable aminoplast resins are, for example, melamineformaldehyde or urea-formyldehyde condensation products. Melamine resins are the melamine methylol compounds partly or completely etherified with $C_1$–$C_4$ monohydric alcohols described in, for example, French Pat. No. 943,411 or by D. H. Solomon, The Chemistry of Organic Film Formers, pages 235–240, J. Wiley & Sons Inc., New York, 1967. The melamine resins can partly or completely be replaced by other cross-linkable aminoplasts as described for example, in "Methoden der Organischen Chemie" (Methods of Organic Chemistry) (Houben-Weyl), Vol. 14/2, part 2, fourth edition, Georg-Thieme Verlag, Stuttgart 1963, pages 319 et seq.

The invention is illustrated by but by no means limited to the following Example, in which the parts and percentages quoted are parts and percentages by weight.

EXAMPLE 832 parts of 2-ethylpropanediol-1.3, 268 parts of 1,1,1-trimethylolpropane, 770 parts of phthalic acid anhydride and 642 parts of adipic acid were heated with stirring to 230° C over a period of 8 hours during which time nitrogen was passed through. The resulting solution was then kept at 230° C until a viscosity corresponding to a time of outflow of 100 seconds (as measured on a 60% solution in xylene in accordance with DIN 53 211) and an acid number of 15 were obtained.

High-gloss, extremely hard and elastic coatings can be produced from 100 parts of the 60% solution and 15 parts of a standard butylated melamine resin (Maprenal RT, Casella Farbwerke Meinkur AG, Frankfurt) following the addition of pigments and auxiliaries within the usual limits.

We claim:
1. Liquid stoving-lacquer systems based on oil-free polyesters of polybasic carboxylic acids, and/or their anhydrides and polyhydric alcohols which polyesters have an acid number of from 1 to 40 and a hydroxyl number of from 50 to 400, characterized in that the alcohol starting components of said polyesters consist of
    A. 30 – 100 mol-%, based on the sum of components A and B, of 2-ethylpropane diol-1.3,
    B. 70 – 0 mol-%, based on the sum of components A and B, of alcohols having from 2 to 6, preferably from 3 to 4, hydroxyl groups and optionally
    C. 0 – 30, preferably 0 – 20, mol-%, based on component A, of other diols.
2. Lacquer systems as claimed in claim 1, wherein a mixture of phthalic acid and adipic acid is used as the carboxylic acid component.
3. Lacquer systems as claimed in claim 1, wherein trimethylolpropane is used as component B.
4. Lacquer systems as claimed in claim 1, wherein they contain less than 30% by weight of a solvent.
5. The lacquer systems as claimed in claim 1 wherein said polyesters have a viscosity corresponding to a time of outflow of from 20 to 300 seconds in accordance with DIN 53 211.

* * * * *